United States Patent
Lovette et al.

(10) Patent No.: US 7,064,781 B1
(45) Date of Patent: Jun. 20, 2006

(54) APPARATUS AND METHODS OF CALIBRATING PIXEL OFF SET AND PIXEL GAIN USING DIGITIAL HARDWARE

(75) Inventors: Whynn Victor Lovette, Ontario, NY (US); John Stewart Ceci, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/466,982

(22) Filed: Dec. 17, 1999

(51) Int. Cl.
*H04N 5/535* (2006.01)
*H04N 5/247* (2006.01)

(52) U.S. Cl. .................... 348/229.1; 348/264

(58) Field of Classification Search ............... 348/175, 348/180, 187, 207.99, 222.1, 229.1, 241, 348/242, 243, 250, 251, 254, 255, 607, 615, 348/622, 678, 683, 223.1, 244, 245, 262, 348/264; 358/463, 465, 466, 504; 382/270, 382/272, 274, 275
See application file for complete search history.

(56) References Cited

U.S. PATENT DOCUMENTS

| | | | | |
|---|---|---|---|---|
| 4,525,741 A | * | 6/1985 | Chahal et al. ............... 348/255 |
| 5,164,726 A | * | 11/1992 | Bernstein et al. ............ 341/120 |
| 5,181,118 A | * | 1/1993 | Kimura ....................... 348/243 |
| 5,267,053 A | * | 11/1993 | Potucek et al. .............. 358/446 |
| 5,442,465 A | * | 8/1995 | Compton ..................... 358/482 |
| 5,514,865 A | * | 5/1996 | O'Neil ...................... 250/208.1 |
| 5,519,441 A | | 5/1996 | Gusmano et al. ....... 348/207.99 |
| 5,565,916 A | * | 10/1996 | Katayama et al. .......... 348/321 |
| 5,925,875 A | * | 7/1999 | Frey ......................... 250/208.1 |
| 6,038,038 A | * | 3/2000 | Selby et al. ................. 358/446 |
| 6,252,536 B1 | * | 6/2001 | Johnson et al. ............. 341/155 |

* cited by examiner

*Primary Examiner*—David Ometz
*Assistant Examiner*—Justin Misleh
(74) *Attorney, Agent, or Firm*—Oliff & Berridge, PLC

(57) ABSTRACT

A calibration system in accordance with the invention, which is implemented at least in part in digital hardware, can calibrate for at least one of pixel offset and pixel gain. Calibration for pixel offset can include a pixel range adjust process which sets up the range for pixel offset calibration while also providing an offset level setpoint. Video output from the pixel range adjust process can be input into a pixel offset process which calibrates the video for offset. Calibration for pixel gain can include an automatic gain control process which sets up the range for pixel gain calibration while also providing for continuing compensation for changes in video intensity. Video output from the automatic gain control process can be input into a pixel gain process which calibrates the video for gain.

21 Claims, 4 Drawing Sheets

APPARATUS AND METHODS OF CALIBRATING PIXEL OFF SET AND PIXEL GAIN USING DIGITIAL HARDWARE

BACKGROUND OF THE INVENTION

1. Field of Invention

This invention is directed to apparatus and methods of calibration.

2. Description of Related Art

Image sensors are incorporated into the structure of, or otherwise utilized in the operation of, various devices, such as, for example, scanners, copiers and facsimile machines. However, conventional image sensors are typically subject to positional errors, which can be referred to as offset errors, and/or intensity errors, which can be referred to as gain errors. These errors effect the quality of the output of the image sensors.

SUMMARY OF THE INVENTION

It is therefore desirable to remove the offset and gain errors to provide a uniform output from the image sensors. Image quality produced by the image sensors is thereby enhanced by making the image sensors' output uniform.

An exemplary type of image sensor that is subject to offset and/or gain errors can include a substrate and an array of chips provided on the substrate. Each chip can include multiple photodiode image bits. The array of chips provided on the substrate can define a full width array. Defining a full width array can be desirable so as to simplify an optics system of the sensor.

An example of this exemplary type of image sensor is a Lakes FWA CMOS image sensor. This image sensor can be utilized with a document scanner, such as, for example, a high quality document scanner. The Lakes FWA CMOS image sensor can include chips that each include 248 photodiode image bits. Each of the 248 photodiode bits can define a pixel.

The chips can have a length of approximately 0.4" and thereby provide an array having a length of approximately 12". The full width array defined by the chips can have dimensions substantially corresponding to dimensions of an object, such as a sheet, imaged by the image sensor and scanned by the scanner. The exemplary image sensor can include multiple channels to transfer images at high scan speeds.

The offset and/or gain errors can be removed to substantially enable the exemplary image sensor to provide a uniform output. The offset and gain errors can be removed for only a portion of the pixels. Alternatively, it may be desirable to remove the offset and gain errors from all of the pixels in order to provide a more uniform output.

Removal of the offset and/or gain errors of each pixel can be accomplished by using a black and/or white calibration strip, in conjunction with a calibration process. The calibration process can be implemented by any determining device, such as, for example, a micro-controller.

The calibration process can include imaging the black and/or white calibration strip, and determining correction values to compensate for offset and gain errors realized via the imaging. The correction values can be stored in a storage device, such as, for example, a memory, and applied while processing normal video. The calibration process can also include offset and/or gain compensation for the transfer of images over multiple channels.

The calibration process can be performed manually. Alternatively, it may be desirable to automate at least part of the calibration process through the use of algorithms. However, the calibration process of the exemplary image sensor for use with high quality document scanners can take a significant amount of time to execute and require substantial computing power.

It is therefore desirable to automate the calibration process by implementing the calibration process in digital hardware. This use of digital hardware reduces the amount of time required for calibration without increasing the computing power. Simplifying the hardware interface reduces manufacturing costs and speeds up production.

The calibration system in accordance with the invention is therefore implemented at least in part in digital hardware. The calibration system can calibrate for at least one of pixel offset and pixel gain.

Calibration for pixel offset can include a pixel range adjust process which sets up the range for pixel offset calibration while also providing an offset level setpoint. Video output from the pixel range adjust process can be input into a pixel offset process which calibrates the video for offset.

Calibration for pixel gain can include an automatic gain control process which sets up the range for pixel gain calibration while also providing for continuing compensation for changes in video intensity. Video output from the automatic gain control process can be input into a pixel gain process which calibrates the video for gain.

The calibration system can calibrate for only one of pixel offset and pixel gain by only including one of the two pairs of processes discussed above. Alternatively, the calibration system can calibrate for both pixel offset and pixel gain by utilizing both pairs of processes in series. The pairs of processes can be performed in any order. For example, the pixel offset can be calibrated first followed by the pixel gain being calibrated, or vice versa.

These and other features and advantages of this invention are described in or are apparent from the following detailed description of various exemplary embodiments of the systems and methods according to this invention.

BRIEF DESCRIPTION OF THE DRAWINGS

Various exemplary embodiments of systems and methods according to this invention will be described in detail, with reference to the following figures, wherein.

DETAILED DESCRIPTION OF PREFERRED EMBODIMENTS

Figure 1:
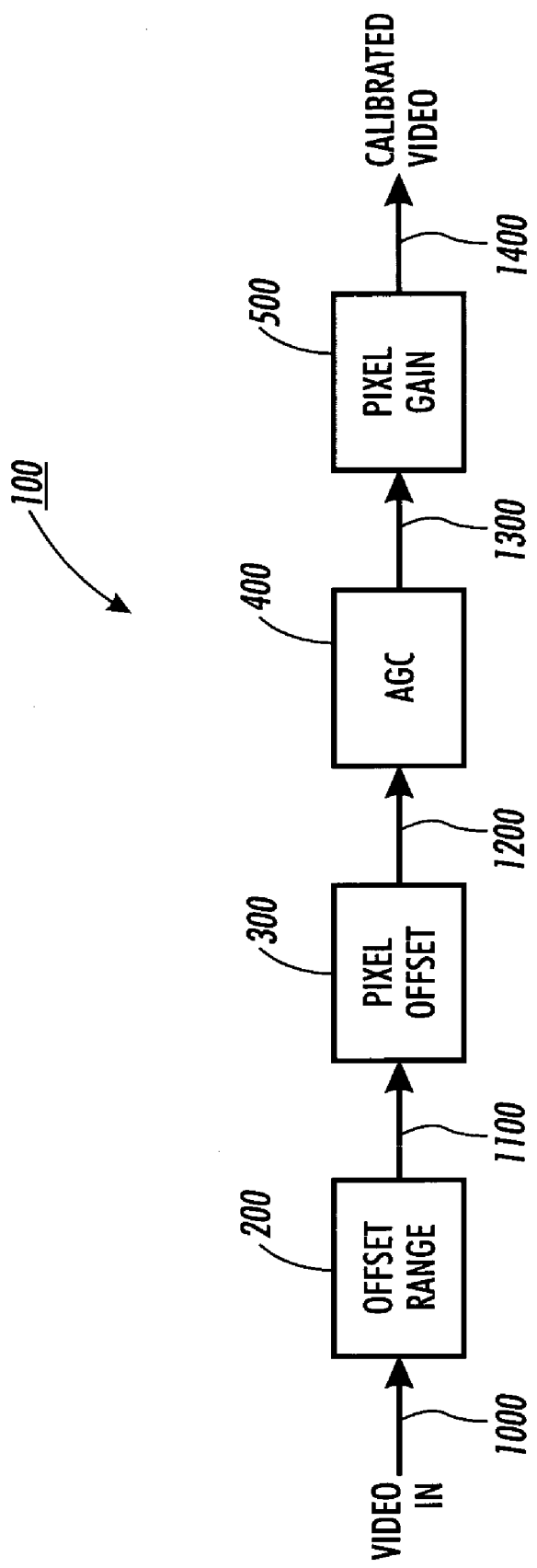
FIG. 1 is a block diagram that shows processes of an exemplary calibration system 100 according to the invention.

FIG. 1 is a block diagram that shows processes of an exemplary calibration system 100 according to this invention. As described below, the processes of the calibration system 100 are implemented via digital hardware.

Uncalibrated video 1000 input into the calibration system 100 is first addressed in an offset range adjust process 200.

The offset range adjust process 200 is an overall offset process since it effects all of the pixels.

Specifically, offset of the video that is input can be controlled via a feedback control loop, which uses non-optical black pixels from each channel. Since pixels can be manipulated in the dark, i.e., without the use of any sensor lights, the offset range adjust process 200 can be referred to as dark calibration.

The offset range adjust process 200 sets up the range of the pixel offset calibration. An automated process can be used to perform this operation. For example, over a sequence of a certain number of video lines, such as 256 video lines, an iterative process can be used to arrive at a dark pixel setpoint that satisfies programmable minimum and maximum boundaries of pixel offset.

In other words, the non-optical black pixels are used to determine which pixels have the largest and smallest values. The pixels having the largest and smallest values are then used to define a range. The entire video is then moved vertically in steps, over a sequence of a certain number of video lines, such as 256 video lines. Each step can define a grey level, where 0 represents black and 256 represents white. An algorithm can then move the video over all 256 grey lines so that the video is within the range.

The offset range adjust process 200 therefore adjusts the black video so as to be within the correction range of the pixel offset. In addition to setting up the range for the pixel offset calibration, and after the video is determined to be within the range, a dark pixel setpoint, i.e., offset level setpoint, can be determined. The offset level setpoint provides compensation for changes in temperature and time in the video, and is discussed below in conjunction with the pixel offset. Thus, the offset range adjust process 200 provides two outputs, i.e., setting up the range for the pixel offset calibration, and providing the offset level setpoint.

Figure 2:
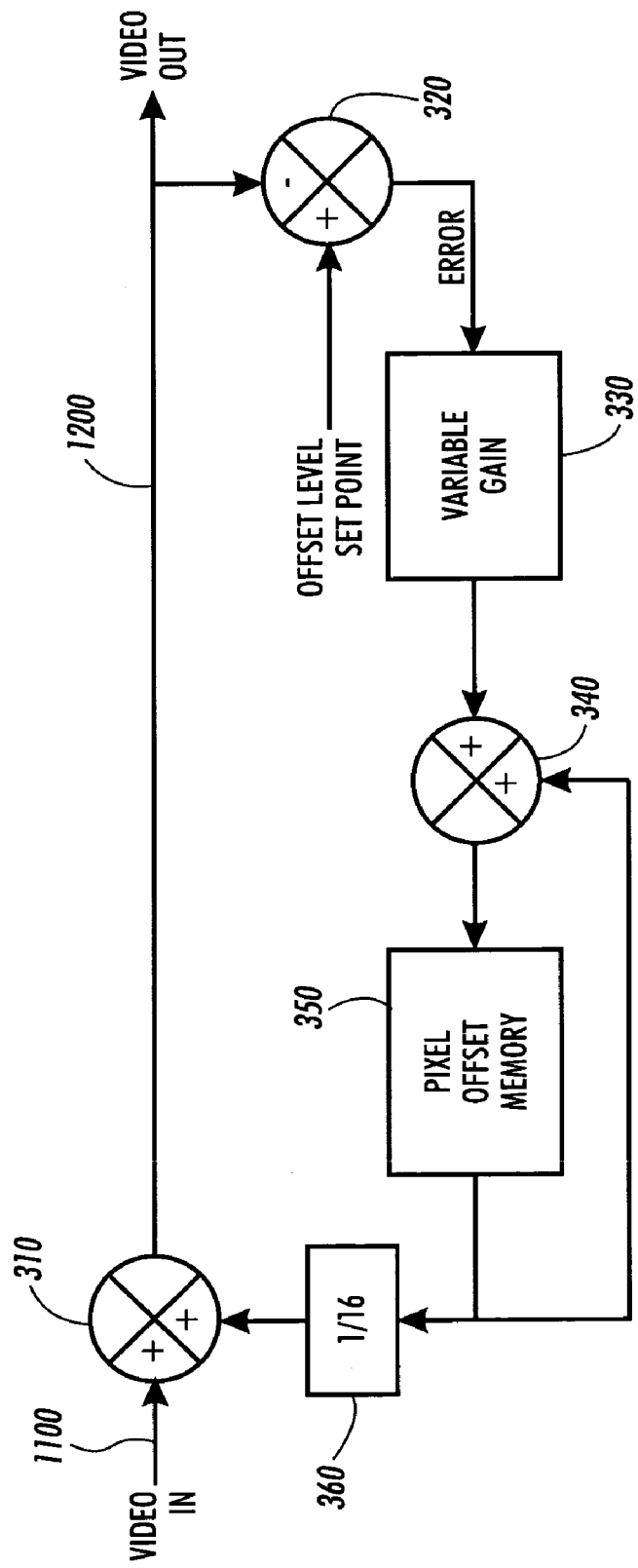
FIG. 2 is a block diagram that shows an exemplary embodiment of a pixel offset process 300.

After the offset range adjust process 200, the calibration system performs a pixel offset process 300. FIG. 2 is a block diagram that shows an exemplary embodiment of the pixel offset process 300.

In summary, in accordance with the pixel offset process 300, the pixel offset range can occupy the lower one fourth of the input video range. The offset for each pixel can be determined using an automated iterative process over a period of 256 lines. During this process, the current offset value for each pixel can be read from a storage device, such as a dedicated memory, and applied to the video. The result is subtracted from the desired set-point, and the error added to the current offset value and written back into memory. This process is performed for each pixel 256 times, once per line. As the process continues, the error can be decreased, or reduced to zero. A series of fixed gain factors can be applied to the error at programmable intervals during the 256 line process.

Specifically, as shown in FIG. 2, video 1100 output from the offset range adjust process 200 enters the pixel offset process 300. The video 1100 first enters an addition block 310, where the video 1100 is added to the result of processes performed in the pixel offset process 300, which are discussed in detail below, to produce an offset adjusted video 1200.

In accordance with the pixel offset process 300, the video 1200 enters a subtraction block 320, where the video 1200 is subtracted from the offset level setpoint that was determined in the offset range adjust process 200. The result of the subtraction block 320 constitutes error, i.e., the difference between the current state of offset of the video and the offset setpoint.

The error then enters a variable gain block 330, where a variable gain factor is applied to the error. The amount of variable gain applied can be fixed for different trip points. For example, the variable gain applied can be large for a first set of trip points, while the variable gain applied can be small for a second set of trip points. Thus, an amount of change can be large at the beginning of 256 scan lines, and be smaller at the end of the 256 scan lines to produce smaller effects.

The resultant of the variable gain block 330 then enters an addition block 340, where the resultant of the variable gain block 330 is added to a pixel offset value stored in a pixel offset memory 350. This operation provides a feedback system wherein the amount of error approaches zero.

The pixel offset value provided by the pixel offset memory 350 then enters a division block 360, where the pixel offset value is divided by 16. This operation provides correspondence between the pixel offset value provided by the pixel offset memory 350 and the video 1100. The output of the division block 360 is then provided to the addition block 310, which as discussed above, provides video 1200. This process is repeated until the amount of error of pixel offset is zero and the video is calibrated for offset.

Figure 3:
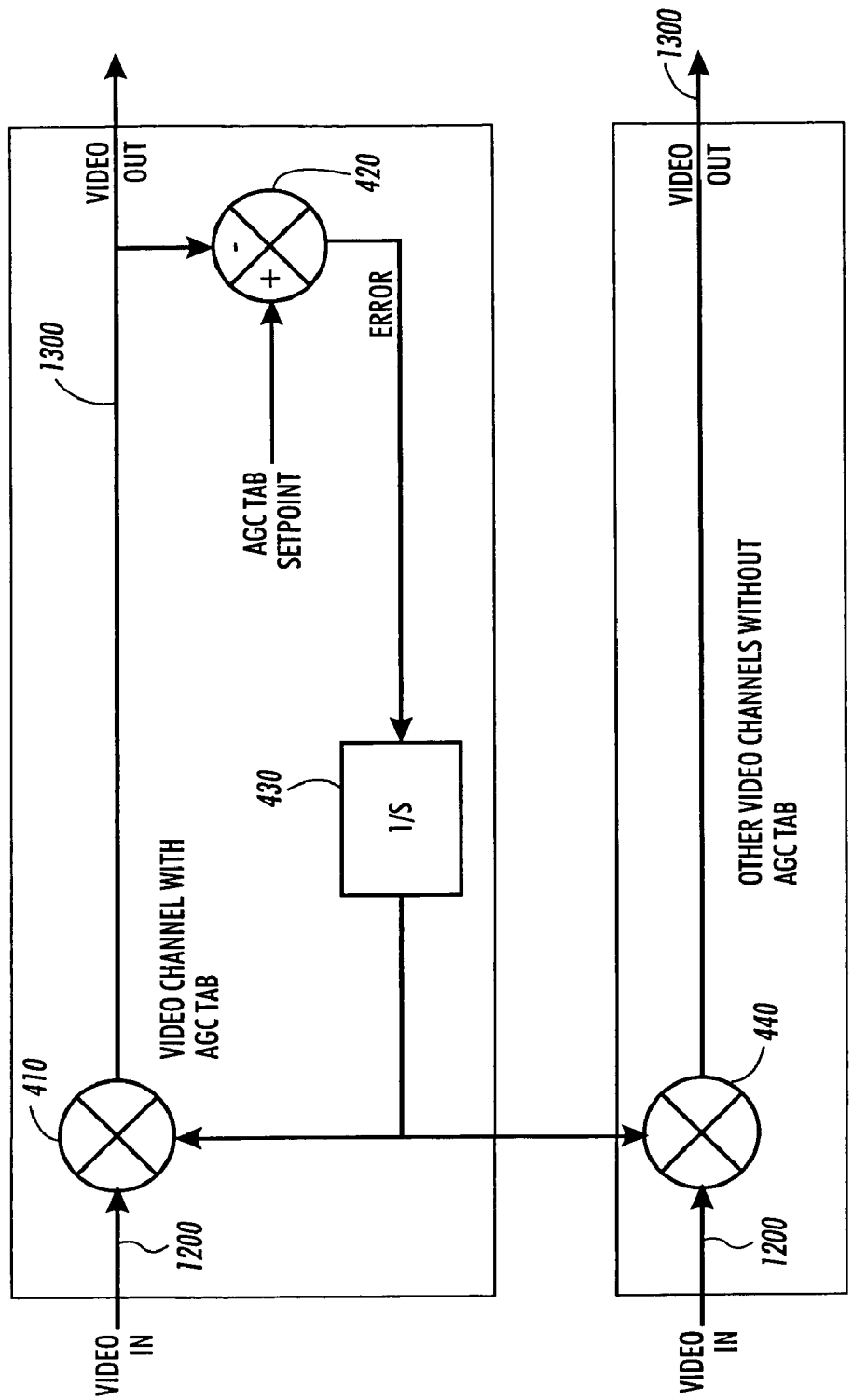
FIG. 3 is a block diagram that shows an exemplary embodiment of an automatic gain control process 400.

After the pixel offset process 300, wherein the offset (dark point) is adjusted to zero, the calibration system performs an automatic gain control process 400 to adjust the system gain (white point). FIG. 3 is a block diagram that shows an exemplary embodiment of the automatic gain control process 400.

In summary, the automatic gain control process 400 is similar to the offset range adjust process 200, in that the automatic gain control process 400 sets up the range for the pixel gain calibration. The automatic gain control process 400 adjusts the video gain over a 256 line period, until the uncalibrated white video of the calibration strip falls within the programmable range limits of pixel gain. In other words, the automatic gain control process 400 adjusts the overall gain so that the gain of all the pixels is within a certain range so that a pixel by pixel calibration can ultimately be performed to satisfy pixel gain requirements.

The automatic gain control process 400 also provides for continuous compensation of changes in video intensity, such as from intensity changes in the illumination lamp of the sensor. This operation can be accomplished by providing an automatic gain control tab, e.g., a white tab, in the image sensing path of the sensor. For example, in one embodiment, the tab may cover a full width array of the sensor. Monitoring a signal ouput of the sensor corresponding to the tab can therefore provide an indication as to whether the illumination lamp has dimmed over time. Alternatively, the tab can be provided in the path of the sensor so as to be only sensed by a single channel of the sensor. The light value determined from the single channel then can be used as a setpoint for calibrating a gain of the rest of the channels/pixels.

The video from the tab is feedback to a control loop, which compensates for changes in the illumination lamp by changing the gain of the video path. The offset range control loops are independent for multiple channels. However, for the compensation of the illumination lamp in a multiple channel system, the control variable is common to all channels, as shown in FIG. 3.

Specifically, the automatic gain control process 400 is performed differently for the video channel with the automatic gain control tab versus the other video channels that do not have the automatic gain control tab. For the video channel with the automatic gain control tab, as shown in FIG. 3, video 1200 provided by the pixel offset process 300 first enters a multiplier 410, where the video 1200 is multiplied with the result of a process, which is discussed in detail below, in order to provide video 1300 output from the channel with the automatic gain control tab.

The video 1300 enters a subtraction block 420, where the video 1300 is subtracted from the automatic gain control tab setpoint that was determined as discussed above. The result of the subtraction block 420 constitutes error, i.e., the difference between the current state of gain of the video and the gain setpoint.

The error then enters an integrator 430. The integrator 430 accumulates the error and applies the error to the video slowly over time. The integrator thereby smooths out the response of the system over time.

The output of the integrator 430 is then provided to the multiplier 410, which, as discussed above, provides video 1300. This process is repeated until the amount of error of pixel gain is zero.

The output of the integrator 430 is also provided to the other video channels that do not have the automatic gain control tabs, as shown in FIG. 3. Specifically, the output of the integrator 430 is provided to a multiplier 440, where the output of the integrator 430 is multiplied with the video 1200 provided by the pixel offset process 300. The output of the multiplier is the video 1300 output from the channels without the automatic gain control tab.

Figure 4:
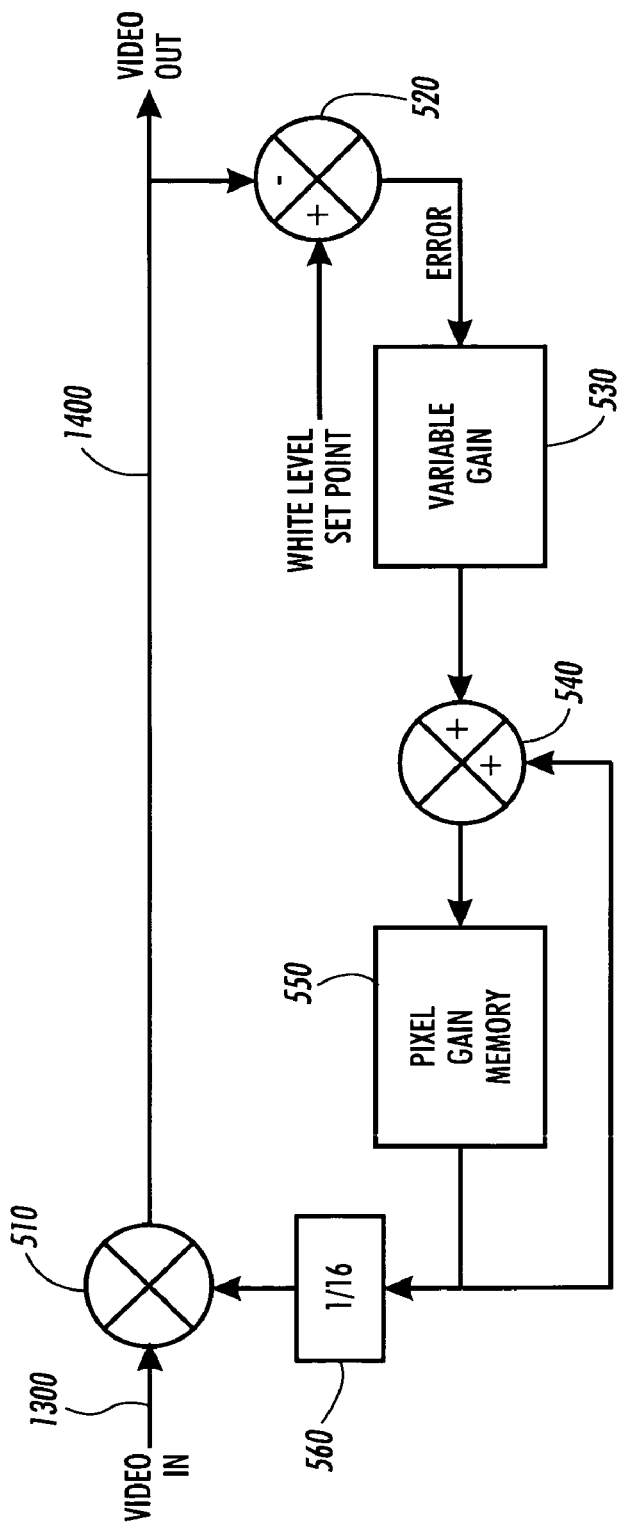
FIG. 4 is a block diagram that shows an exemplary embodiment of a pixel gain process 500.

After the automatic gain control process 400, the calibration system performs a pixel gain process 500. FIG. 4 is a block diagram that shows an exemplary embodiment of the pixel gain process 500.

The typical pixel gain correction range is approximately 2:1 for document scanners. The output video range of this process is one fourth the input range.

In summary, the pixel gain process 500 iterates through 256 lines, reading the current gain value from a storage device, such as a memory, and applying the current gain value to the video, as shown in FIG. 4. This result is subtracted from the programmable white level setpoint to generate an error value. Gain is applied to this error as in the pixel offset process, and the result is summed with the value read from memory, and a new value is written back into memory. This sequence is executed for each pixel in the scan line, 256 times.

Specifically, as shown in FIG. 4, video 1300 output from the automatic gain control process 400 enters the pixel gain process 500. The video 1300 first enters a multiplier 510, where the video 1300 is multiplied with the result of processes performed in the pixel gain process 500, which are discussed in detail below, to produce a gain adjusted video 1400.

In accordance with the pixel gain process 500, the video 1400 enters a subtraction block 520, where the video 1400 is subtracted from the white level setpoint that was determined in the automatic gain control process 400. The result of the subtraction block 520 constitutes error, i.e., the difference between the current state of gain of the video and the gain setpoint.

The error then enters a variable gain block 530, where a variable gain factor is applied to the error. As previously discussed, the amount of variable gain applied can be fixed for different trip points.

The resultant of the variable gain block 530 then enters an addition block 540, where the resultant of the variable gain block 530 is added to the pixel gain value stored in the pixel gain memory 550. This operation provides a feedback system wherein the amount of error approaches zero.

The pixel gain value provided by the pixel gain memory 550 then enters a division block 560, where the pixel gain value is divided by 16. This operation provides correspondence between the pixel gain value provided by the pixel gain memory 550 and the video 1300. The output of the division block 560 is then provided to the multiplier 510, which, as discussed above, provides video 1400. This process is repeated until the amount of error of pixel gain is zero and the video is calibrated for gain.

The video 1400 output from the pixel gain process 500 is therefore calibrated for pixel offset and pixel gain.

The use of digital hardware discussed above, and shown in FIGS. 2–4, reduces the amount of time required for calibration without increasing the computing power. Simplifying the hardware interface reduces manufacturing costs and speeds up production.

The above embodiments are discussed in terms of offset and/or gain calibration. However, the invention is intended to cover the calibration of other aspects of video via the use of digital hardware. In fact, the invention is also intended to cover the calibration of attributes not related to video via the use of digital hardware.

The various processes described above can be implemented using a programmed general purpose computer. However, the various processes described above can also be implemented on a special purpose computer, a programmed microprocessor or microcontroller and peripheral integrated circuit elements, an ASIC or other integrated circuit, a digital signal processor, a hardwired electronic or logic circuit such as a discrete element/circuit, a programmable logic device such as a PLD, PLA, FPGA or PAL, or the like. In general, any device, capable of implementing a finite state machine that is in turn capable of implementing the processes discussed above, can be used to implement the various processes described above.

Communication links utilized in the processes can be any known or later developed device or system for connecting determining devices, including a direct cable connection, a connection over a wide area network or a local area network, a connection over an intranet, a connection over the Internet, or a connection over any other distributed processing network or system. In general, the communication links can be any known or later developed connection system or structure usable to connect the determining devices.

While the amendments of this invention have been described in conjunction with the specific embodiments outlined above, it is evident that many alternatives, modifications and variations will be apparent to those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. A method of calibrating video, comprising:
   calibrating at least one of pixel offset and pixel gain of a video signal;
   calibrating for pixel gain a video signal input for a video channel provided with an automatic gain control tab by sensing the video signal input for the video channel provided with the automatic gain control tab to determine a value for calibration; and
   calibrating for pixel gain a video signal input for a video channel not provided with the automatic gain control tab by multiplying the video signal input for the video channel not provided with the automatic gain control tab with a video signal output error value from an integrator, said video signal output error value compensating for pixel error for both the video signal for the video channel provided with the automatic gain control tab and the video signal for the video channel not provided with the automatic gain control tab.

2. The method according to claim 1, further including calibrating for pixel offset by setting a correction range for pixel offset calibration, adjusting an uncalibrated video signal to be within the correction range, and providing an offset level setpoint before calibrating pixel gain.

3. The method according to claim 2, further including calibrating for pixel offset by subtracting a current state of offset of a video signal from the offset level setpoint to provide an error value.

4. The method according to claim 3, further including calibrating for pixel offset by applying a variable gain factor to the error value to provide a variable gain/error value.

5. The method according to claim 4, wherein the variable gain factor is fixed for different trip points.

6. The method according to claim 4, further including calibrating for pixel offset by adding the variable gain/error value to a pixel offset value stored in a storage device to provide a specified pixel offset value.

7. The method according to claim 6, further including calibrating for pixel offset by dividing the specified pixel offset value by 16.

8. The method according to claim 7, further including calibrating for pixel offset by adding the divided value to the video signal adjusted to be within the range.

9. The method according to claim 1, further including calibrating for pixel gain by setting a range for pixel gain calibration, adjusting an uncalibrated video signal to be within the range, and providing for continuing compensation of changes in video intensity.

10. The method according to claim 9, further including calibrating for pixel gain the video signal input for the video channel provided with the automatic gain control tab by subtracting a current state of gain of the video signal from an automatic gain control tab setpoint to provide the error value.

11. The method according to claim 10, further including calibrating for pixel gain by inputting the error value into the integrator to apply the error value to a video signal over a period of time.

12. The method according to claim 11, further including calibrating for pixel gain by multiplying the video signal output error value from the integrator with a video signal input for the video channel provided with the automatic gain control tab.

13. The method according to claim 1, further including calibrating for pixel gain by subtracting a current state of gain of a video signal from a white level setpoint to provide an error value.

14. The method according to claim 13, further including calibrating for pixel gain by applying a variable gain factor to the error value to provide a variable gain/error value.

15. The method according to claim 14, wherein the variable gain factor is fixed for different trip points.

16. The method according to claim 14, further including calibrating for pixel gain by adding the variable gain/error value to a pixel gain value stored in a storage device, to provide a specified pixel gain value.

17. The method according to claim 16, further including calibrating for pixel gain by dividing the specified pixel gain value by 16.

18. The method according to claim 17, further including calibrating for pixel gain by multiplying the divided value to the video signal adjusted to be within the range.

19. An image sensor for use with a document scanner, comprising:

digital hardware that calibrates at least one of pixel offset and pixel gain of a video signal;

an automatic gain control tab provided for a video channel; and an integrator, wherein pixel gain for a video signal input for a video channel other than the video channel provided with the automatic gain control tab is calibrated for by multiplying the video signal with a video signal output error value from the integrator, said video signal output error value compensating for pixel error for both the video signal input for the video channel provided with the automatic gain control tab and the video signal input for the video channel not provided with the automatic gain control tab.

20. The image sensor according to claim 19, further including a device that calibrates for pixel offset by setting a range for pixel offset calibration, adjusting an uncalibrated video signal to be within the range, and providing an offset level setpoint.

21. The sensor according to claim 19, further including a device that calibrates for pixel gain by setting a range for pixel gain calibration, adjusting an uncalibrated video signal to be within the range, and providing for continuing compensation of changes in video intensity.

* * * * *